United States Patent
Hoffmann et al.

(10) Patent No.: US 6,367,684 B1
(45) Date of Patent: Apr. 9, 2002

(54) METHOD AND DEVICE FOR WORKING A WELD ON A SUPPORT SLEEVE

(75) Inventors: Eduard Hoffmann, Bobingen; Alfons Grieser, Sielenbach; Johann Winterholler, Friedberg, all of (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 0 days.

(21) Appl. No.: 09/306,596

(22) Filed: May 6, 1999

(30) Foreign Application Priority Data

May 7, 1998 (DE) .......................... 198 20 357

(51) Int. Cl.[7] .......................... B23K 31/00; B41F 7/02; B21B 21/00
(52) U.S. Cl. .................. 228/125; 228/17.5; 228/147; 228/173.5; 101/217; 72/193
(58) Field of Search ................... 228/125, 147, 228/173.5, 17.5; 29/33 D; 219/61.1; 101/217; 72/193

(56) References Cited

U.S. PATENT DOCUMENTS

| 1,975,939 | A |   | 10/1934 | Grotnes ............... 164/66 |
| 2,360,636 | A | * | 10/1944 | Anderson ............. 78/87 |
| 3,085,528 | A | * | 4/1963 | La Tour ............... 113/33 |
| 3,729,124 | A | * | 4/1973 | Kedzior et al. ....... 228/19 |
| 3,902,552 | A | * | 9/1975 | McLain ............... 165/179 |
| 3,965,551 | A | * | 6/1976 | Ostrowski ........... 29/33 D |
| 4,081,649 | A | * | 3/1978 | Tonkovich ........... 219/61.1 |
| 4,326,398 | A | * | 4/1982 | Begue ................. 72/193 |
| 4,353,236 | A | * | 10/1982 | Byrd .................. 72/193 |
| 4,483,167 | A | * | 11/1984 | Hayashi ............... 72/179 |
| 4,830,258 | A | * | 5/1989 | Lentz et al. ......... 228/17.5 |
| 4,870,732 | A | * | 10/1989 | Becker ................ 29/121.5 |
| 4,995,549 | A | * | 2/1991 | Hellman, Sr. ........ 228/147 |
| 5,125,337 | A | * | 6/1992 | Zeller ................. 101/217 |
| 5,205,468 | A | * | 4/1993 | Budenbender ........ 228/164 |
| 5,260,539 | A | * | 11/1993 | Reinke ............... 219/56 |
| 5,351,615 | A | * | 10/1994 | Kobler et al. ........ 101/217 |
| 5,379,693 | A | * | 1/1995 | Hoffman et al. ..... 101/375 |
| 5,488,903 | A | * | 2/1996 | Kobler et al. ........ 101/375 |
| 5,552,005 | A | * | 9/1996 | Mammino et al. .... 156/157 |
| 5,624,067 | A |   | 4/1997 | Harwig et al. ........ 228/216 |

FOREIGN PATENT DOCUMENTS

| DE | 33 46 750 A1 | 3/1985 | ........ B23K/37/08 |
| DE | 41 40 768 A1 | 6/1993 | ........ B41F/27/06 |
| DE | 42 17 793 C1 | 12/1993 | ........ B41N/10/00 |
| DE | 44 32 814 | 3/1996 | ........ B41F/27/06 |
| EP | 0 703 092 A1 | 3/1996 | ........ B41N/1/20 |
| FR | 1332631 | 6/1962 | |
| FR | 1457183 | 12/1965 | |

* cited by examiner

*Primary Examiner*—M. Alexandra Elve
*Assistant Examiner*—L. Edmondson
(74) *Attorney, Agent, or Firm*—Cohen, Pontani, Lieberman & Pavane

(57) ABSTRACT

A method for smoothing and compacting a weld on a cylindrical support sleeve includes mounting the support sleeve on an abutment and moving a device across the support sleeve such that a roller on the support sleeve rolls on the weld under pressure so that it smooths and levels the weld. An arrangement for smoothing and compacting a weld on a cylindrical support sleeve includes, the abutment on which the support sleeve may be mounted, the device, and the roller.

5 Claims, 1 Drawing Sheet

METHOD AND DEVICE FOR WORKING A WELD ON A SUPPORT SLEEVE

BACKGROUND OF THE INVENTION

1. Field of the Invention

The present invention relates to a device and a method for working a weld on a support sleeve for a printing or transfer form cylinder made of a metallic material.

2. Description of the Related Art

It is known from flexographic printing9 to apply sleeve-shaped printing and transfer forms to nickel sleeves produced by electroplating. These printing and transfer forms are pushed over a cylinder in a known manner using compressed air and are fixed to the cylinder by shutting off the compressed air supply.

A prior art sleeve-shaped offset printing form disclosed in German reference DE 41 40 768 A1 is produced from a metal plate that is cut to size in a rectangular shape. The rectangular shaped plate is then formed into a sleeve and the ends of the plate which face each other are connected by a weld. The entire outer surface are of this support sleeve is coated and exposed except for the weld. Another German reference DE 42 17 793 C1 discloses a prior art sleeve-shaped offset rubber blanket which is also produced from a cut-to-size support plate. A rubber coating is applied to the support plate in the flat state of the support plate and the support plate with the rubber blanket is then formed into a sleeve shape with the ends of the support plate being welded to one another along with the rubber coating for completing the sleeve. Although this prior art printing and transfer form performs printing without a cylinder groove, continuous printing can not be performed. That is, only printed products can be produced.

Prior art support sleeves suitable for continuous printing are disclosed by German reference 44 32 814 A1. The initial shape for these printing or transfer forms is a rectangular thin-walled plate piece that is formed into the desired hollow cylindrical shape by bending. The resulting edges pointing toward one another are firmly connected. The sleeve surface must then be worked to form a homogeneous circumferential outer surface for continuous printing. The working of the sleeve surface for creating a smooth surface is accomplished using known machining methods such as turning or grinding.

SUMMARY OF THE INVENTION

The object of the present invention is to provide a novel method and device for working the outer cylindrical surface of a support sleeve for a printing or transfer form made from a metal plate having the two ends firmly connected, such that the resulting support sleeve is suitable for continuous printing.

The object is achieved by a method for working the outer surface of a weld on a support sleeve for printing or transfer forms, comprising the steps of arranging a support sleeve having a substantially longitudinal weld on an abutment adapted for supporting an inner circumferential surface of the support sleeve at least in an area of the weld on the support sleeve, and compacting and smoothing the weld on the support sleeve by rolling a roller over the weld from outside the support sleeve along a longitudinal direction of the support sleeve.

The object is also achieved by an arrangement for working a substantially longitudinal weld on a support sleeve for a printing or transfer form, comprising an abutment having a longitudinal direction for receiving the support sleeve having the substantially longitudinal weld in a received position, a device movably arranged for moving along the longitudinal direction of said abutment, and a roller rotatably mounted on said device and facing said abutment, said roller moving with said device along the longitudinal direction such that said roller is rollable on the substantially longitudinal weld of the support sleeve receivable on said abutment for compacting and smoothing the weld.

The invention provide a method for smoothing the weld on a circumferential surface of a printing or transfer form so that no unevenness remains. The advantage of the invention is that the resulting sleeve may be coated or exposed in the region of the weld. If the sleeve is a transfer form, a rubber coating may be applied in the region of the weld. If the sleeve is a printing form, the printing form may be provided with an image using a material corresponding to a printing subject in the region of the weld.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
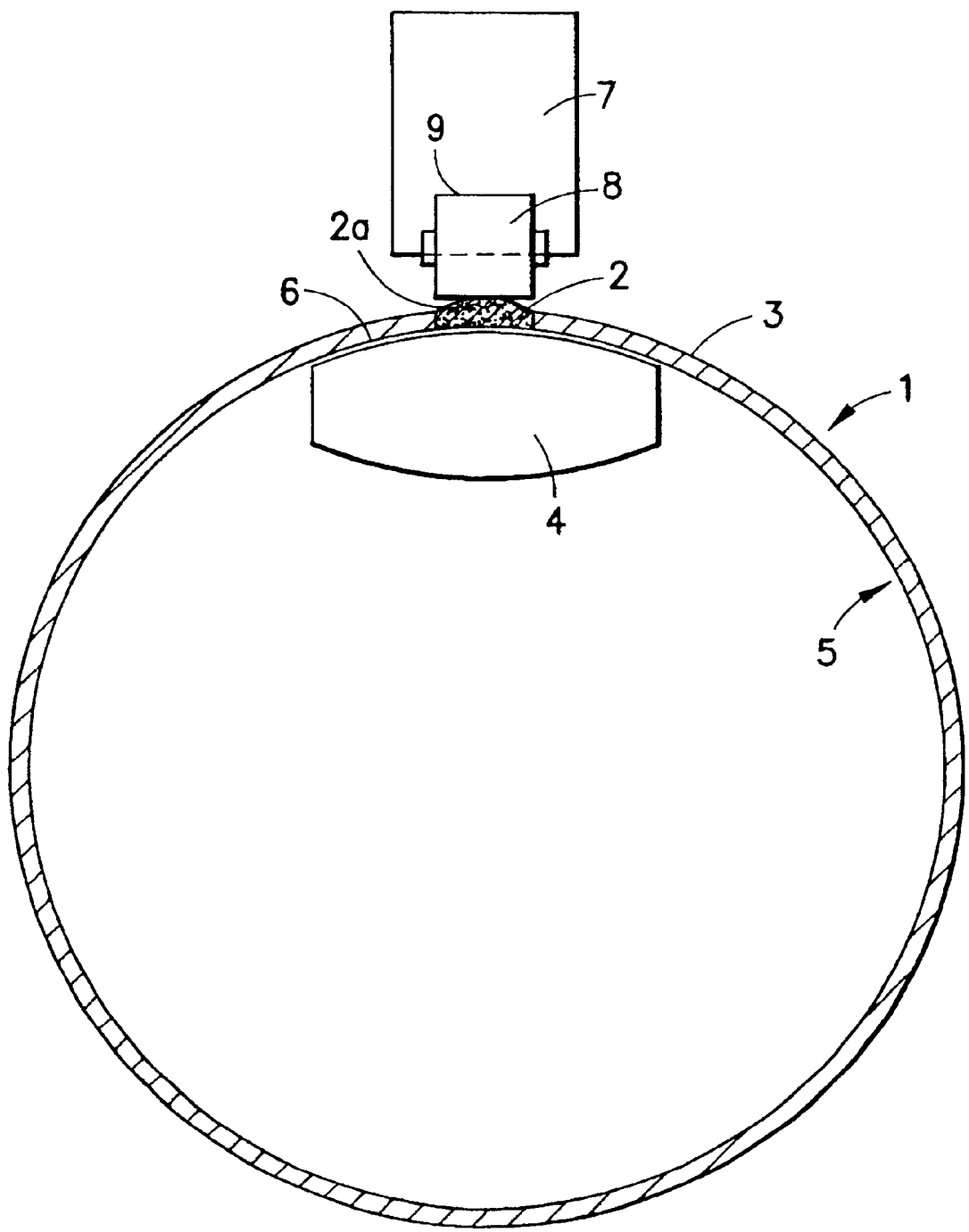
FIG. 1 shows a device for working a weld on a support sleeve for a printing or transfer form cylinder.

Referring to the FIGURE, a support sleeve 1 comprising a metallic material such, for example, as aluminum, steel, high-grade steel, or brass, has undergone a bending procedure for bending a rectangular, thin-walled plate piece into the desired hollow cylindrical shape such, for example, as disclosed in German reference DE 44 32 814 A1. The support sleeve 1 comprises, for example, a wall thickness of 0.1 to 0.6 mm. The support sleeve 1 also includes a weld 2 with a slight overfill 2a relative to an outer circumferential surface 3 of the support sleeve 1. To remove the overfill 2a, the support sleeve 1 is pushed onto an abutment 4 which supports the support sleeve 1 on an inner circumferential surface 5 of the support sleeve 1.

The abutment 4 may be sized such that it fills the entire interior space enclosed by the support sleeve 1 or it may have a contour 6 of the inner circumferential surface 5 for supporting the support sleeve 1 at least in the region of the weld 2 so that the support sleeve 1 rests firmly on the abutment 4 at least in the region of the weld 2.

A device 7 having a roller 8 is used to smooth the weld 2 as follows: While the support sleeve 1 is mounted on the abutment 4, the device 7 is moved along the longitudinal axis of the support sleeve 1. Simultaneously, the roller 8 is pressed by a force against the weld 2 and rolls over the weld 2 while the device 7 is moved along the support sleeve 1.

The weld is compressed and smoothed by the rolling of the roller 8 such that the region of the weld 2 assumes the same radius of curvature as the outer circumferential surface 3 upon completion of the rolling of the roller 8. Any unevenness in the region of the outer surface of the weld 2 is also smoothed by the rolling of roller 8. To accomplish the smoothing, the roller 8 comprises a contour 9 which may be flat, concave or convex. For example, the contour 9 may be concave such that it is adapted to the radius of curvature of the outer circumferential surface 3. A roller 8 having a flat or convex contour 9 may be used for initial smoothing of the weld 2 before a final smoothing using the concave contour which corresponds to the outer circumferential surface 3.

This inventive rowing method smooths all unevenness in the region of the weld 2 by compaction in contrast to the cutting methods of the prior art. After the rolling has been completed, the support sleeve 1 may be subsequently worked and machined in any known manner. The support sleeve may then be coated with a rubber coating or may provided with an image using material corresponding to a printing subject for service as a printing form.

The support sleeve 1 may also have a plurality of layers having ends connected by a weld 2 that is smoothed as described above. Therefore, if a support sleeve to which a rubber coating has been applied in the flat state has been welded together with the rubber coating in place, as disclosed in German reference DE 42 17 793 C1, this support sleeve may be smoothed in the region of its weld 2 as described above by the device 7 and the roller 8.

A device and a method for smoothing and compacting a weld 2 on a cylindrical support sleeve 1 are provided by the invention. The cylindrical support 1 rests on the abutment 4 while the device 7 is moved across the support sleeve 1 in the longitudinal direction of the support sleeve 1. A roller 8 mounted on the device 7 is rolled over the weld under pressure as the device is moved so that is levels and smooths the weld 2.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

The invention is not limited by the embodiments described above which are presented as examples only but can be modified in various ways within the scope of protection defined by the appended patent claims.

We claim:

1. A method for working the outer surface of a weld arranged between two circumferential ends of a support sleeve for printing or transfer forms, comprising the steps of:

arranging a support sleeve having two circumferential ends and a substantially longitudinal weld arranged between the two circumferential ends on an abutment for supporting the support sleeve so that the abutment supports the support sleeve along the length of the longitudinal weld, the abutment having a contour adapted to a shape of an inner circumferential surface of the support sleeve at least in an area of the weld on the support sleeve, and the support sleeve being arranged for supporting at least one of printing forms and transfer forms for offset printing; and compacting and smoothing an outer surface of the weld on the support sleeve by rolling a roller over the outer surface of the weld along a longitudinal direction of the support sleeve relative to the abutment and the support sleeve while the inner circumferential surface of the support sleeve in the area of the longitudinal weld is directly supported by the abutment.

2. An arrangement for working a substantially longitudinal weld arranged between two circumferential ends on a support sleeve for a printing or transfer form for offset printing, comprising:

an abutment having a longitudinal direction for receiving and supporting the support sleeve in a received position, said abutment directly supporting an inner circumferential surface of the support sleeve along the length of the longitudinal weld of the support sleeve and having a contour corresponding to a shape of the inner circumferential surface of the support sleeve;

a device movably arranged for moving along the longitudinal direction of said abutment; and a roller rotatably mounted on said device and facing said abutment, said roller moving with said device along the longitudinal direction such that said roller is rollable on the substantially longitudinal weld of the support sleeve receivable on said abutment for compacting and smoothing the weld, said roller being movable relative to said abutment and the support sleeve supported on said abutment.

3. The arrangement of claim 2, wherein said abutment comprises a cylinder and the support sleeve to be supported is receivable on said cylinder.

4. The arrangement of claim 2, wherein said roller comprises a circumferential outer surface having a concave contour.

5. The arrangement of claim 2, wherein said roller comprises a circumferential outer surface having a flat or convex contour.

* * * * *